United States Patent [19]

Freitag et al.

[11] Patent Number: 4,709,790

[45] Date of Patent: Dec. 1, 1987

[54] CONTINUOUSLY ADJUSTABLE LENGTH ADJUSTMENT DEVICE

[75] Inventors: Herbert Freitag, Koblenz; Castor Fuhrmann, Brachtendorf; Hans-Josef Hosan, Neuwied, all of Fed. Rep. of Germany

[73] Assignee: Stabilus GmbH, Koblenz-Neuendorf, Fed. Rep. of Germany

[21] Appl. No.: 783,840

[22] Filed: Oct. 3, 1985

[30] Foreign Application Priority Data

Oct. 10, 1984 [DE] Fed. Rep. of Germany ....... 3437098

[51] Int. Cl.$^4$ .............................................. F16F 9/44
[52] U.S. Cl. .................................... 188/300; 188/280; 188/322.17; 267/64.12
[58] Field of Search .................. 188/300, 319, 312.17, 188/269, 284, 67; 297/345; 267/64.12

[56] References Cited

U.S. PATENT DOCUMENTS

| | | | |
|---|---|---|---|
| 3,038,560 | 6/1962 | Long, Jr. .............................. | 188/280 |
| 3,147,966 | 9/1964 | Axthammer et al. ............ | 267/64.17 |
| 3,447,645 | 6/1969 | Dorner et al. ....................... | 188/269 |
| 3,762,514 | 10/1973 | Freitag ............................. | 188/280 X |
| 3,856,287 | 12/1974 | Freitag .............................. | 267/64.11 |
| 3,893,730 | 7/1975 | Homier .................................. | 188/67 |
| 4,139,186 | 2/1979 | Postema et al. ...................... | 188/300 |
| 4,307,874 | 12/1981 | Reuschenbach et al. ........ | 267/64.15 |
| 4,582,303 | 4/1986 | Taylor ......................... | 188/322.17 X |

FOREIGN PATENT DOCUMENTS 2024749 8/1980 Fed. Rep. of Germany .

*Primary Examiner*—George E. A. Halvosa
*Assistant Examiner*—Matthew C. Graham
*Attorney, Agent, or Firm*—Brumbaugh, Graves, Donohue & Raymond

[57] ABSTRACT

In a steplessly adjustable hydropneumatic device the spring chamber of which is arranged at the piston rod exit end and which works with a liquid locking, a very simple hydraulic locking is obtained even for high traction stressing upon the piston rod in that both an annular separator piston and the partition are arranged in the inner chamber of the container, which is penetrated by the piston rod. For the hydraulic traction locking in the case of traction forces exerted suddenly upon the piston rod a valve device is provided which cooperates with the piston rod.

18 Claims, 4 Drawing Figures

CONTINUOUSLY ADJUSTABLE LENGTH ADJUSTMENT DEVICE

BACKGROUND OF THE INVENTION

Continuously adjustable length adjustment devices are used e.g. in motor vehicles seats for the adjustment of the back rest.

STATEMENT OF THE PRIOR ART

A continuously adjustable length adjustment device is known from German Pat. No. 2,024,749 where a partition is arranged in an inner partial chamber defined within a cavity of a container by a piston unit. A non-return throttle valve is provided in the partition which non-return throttle valve in the case of a sudden impact-type loading closes the chambers defined by the partition. In accordance with this known construction both the partition and a separator piston separating a liquid filling from a gas filling under pressure are arranged between the piston unit and the container bottom. Such a construction renders it possible that in the case of sudden pushing in of the piston rod a desired hydraulic locking of the piston rod in relation to the container is caused, as the partial chamber adjoining the gas chamber is locked off.

OBJECT OF THE INVENTION

It is the object of the present invention, in a steplessly adjustable hydro-pneumatic device having a spring chamber arranged in the region of the piston rod exit end, to avoid an undesired resilient outward movement of the piston rod even in the case of high traction forces exerted suddenly upon the piston rod. The device is to have the simplest possible assembly and to possess high operational reliability.

SUMMARY OF THE INVENTION

In view of the above objects, in a continuously adjustable length adjustment device a cylindrical container is provided having an axis, two end walls, namely a first and a second end wall, and a cavity between said two end walls. A piston rod axially extends inwards and outwarts of said cavity through said first end wall. A piston unit is connected with said piston rod within said cavity and divides said cavity into two subcavities, a first subcavity adjacent said first end wall and a second subcavity adjacent said second end wall. The first subcavity contains an elastically compressible compensation volume adjacent said first end wall and a hydraulic volume adjacent said piston unit. The hydraulic volume and said second subcavity are filled with a hydraulic liquid. The hydraulic volume and said second subcavity are interconnected by passage means. Voluntarily operable valve means are provided for opening and closing said passage means. An annular partition unit is provided within said hydraulic volume axially intermediate said elastic compensation volume and said piston unit, said partition unit separating said hydraulic volume into a first subvolume adjacent said elastic compensation volume and a second subvolume adjacent said piston unit. Throttled throughflow means interconnect said first and second subvolumes such that a pressure difference occurs between a higher pressure within said second subvolume and a lower pressure in said first subvolume in response to traction acting onto said piston rod in the sense of extraction of said piston rod from said container in the closed state of said voluntarily operable valve means. Locking means are provided for preventing extraction of said piston rod, said locking means being responsive to said pressure difference.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will now be explained in greater detail by reference to various examples of embodiment, wherein.

DESCRIPTION OF THE PREFERRED EMBODIMENTS

Figure 1:
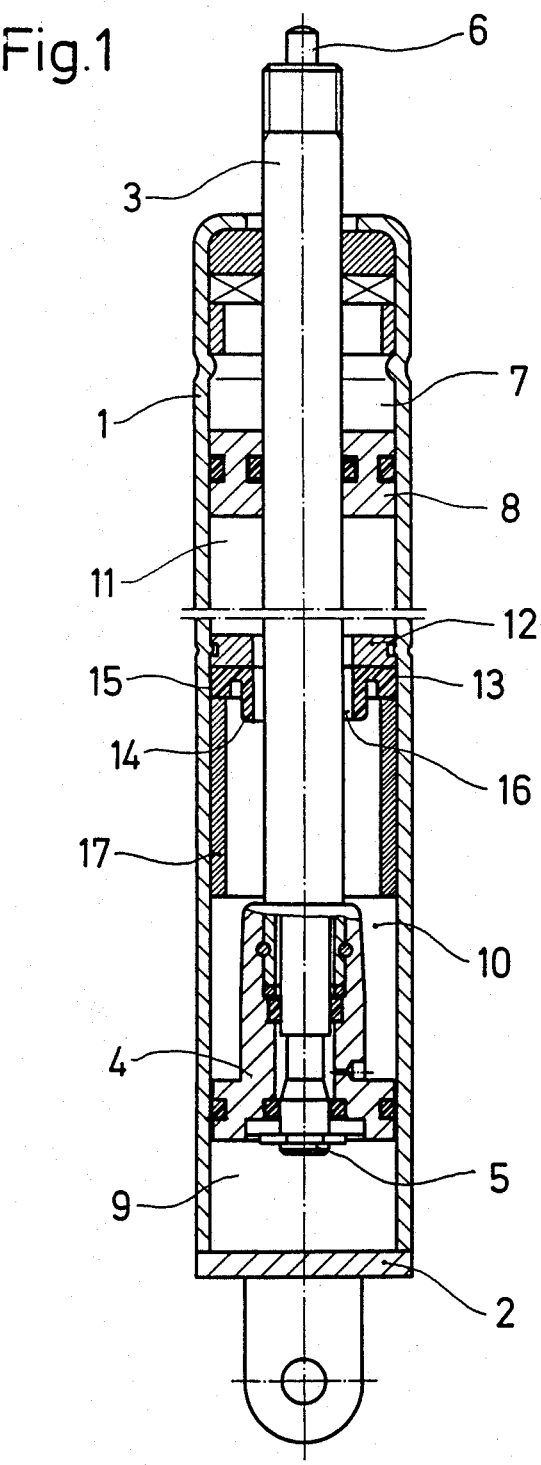
FIG. 1 shows a longitudinal section through a steplessly adjustable hydro-pneumatic device with a pressure-dependently closing locking device.

The steplessly adjustably hydropneumatic device as shown in FIG. 1 possesses a cylindrical container 1 which on the one hand is closed by an end wall, namely a container bottom 2, and on the other hand comprises a guide and seal for a piston rod 3 emerging from the container, said guide and seal defining a further end wall. A piston 4 is firmly connected with the piston rod 3, and a shut-off valve 5 voluntarily operable by a valve push member 6 from the exterior is provided. In the region of the piston rod exit end of the container 1 a spring chamber or elastic compensation volume 7 is provided which comprises a gas filling or mechanical spring elements under pressure and acts therewith upon an axially movable separator piston 8. In the interior of the container 1 in the region of the container bottom 2 there is provided a liquid-filled partial chamber or subcavity 9 defined by the piston 4 and connectable with the partial chamber or subvolume 10 on the piston rod side when the shut-off valve 5 is opened. A further liquid-filled partial chamber or subvolume 11 is limited for the one part by the separator piston 8 and on the other part by a partition 12. On the end face of the partition 12 facing the partial chamber 10 on the piston rod side there lies a U or V ring seal 13 which is provided with an inner sealing lip 14 and an outer sealing lip 15. Together with the outer surface of the piston rod 3, the inner sealing lip 14 forms a throughflow cross-section 16 in the case of equality of pressure between the partial chambers 10 and 11. A bush 17 serving as stop for the piston 4 and guided with friction axially movably on the inner wall of the cylinder 1 bears with the one end face against the outer sealing lip 15 of the U or V ring seal 13, whereby an elastic stop is formed by the outer sealing lip 15 for the piston 4.

The liquid filling in the partial chambers 9, 10 and 11 is initially stressed by the force exerted in the spring chamber 7 upon the separator piston 8, so that when the shut-off valve 5 is opened an outward thrust force corresponding to the product of the pressure of the liquid filling and the cross-sectional area of the piston rod 3 is exerted upon the piston rod 3. Thus when the shut-off valve 5 is opened the desired outward thrust length of the piston rod 3 can be set. After the desired position is reached the shut-off valve 5 is closed by release of the valve push member 6, whereby the piston 5 and thus the piston rod 3 are hydraulically locked. The piston 4 cannot be pushed appreciably, if at all, in the inward thrust direction of the piston rod 3, as a result of the non-compressibility of the liquid filling in the partial chamber 9. If on the other hand a traction force acts upon the piston rod 3, then the liquid filling in the partial chambers 10 and 11 exerts a force directed oppositely to the spring force of the spring chamber 7, so that on exceeding of this spring force the piston 4 and thus the piston rod 3 can be drawn out resiliently. Especially when such steplessly adjustable hydro-pneumatic devices are used for motor vehicle seats, this is disadvantageous on the occurrence of great forces such as are exerted for example in a collision accident upon the seat back rest. In order to prevent this behaviour in the case of suddenly occurring great forces, in the case of a sudden traction stressing of the piston rod 3 the pressure in the partial chamber 10 will rise, whereby the sealing lip 14 is pressed against the outer wall of the piston rod 3 and thus closes the throughflow cross-section 16. Then there is no longer any liquid exchange between the partial chambers 10 and 11, so that there is hydraulic locking of the piston 4 and thus of the piston rod 3. Accordingly even in the case of a strongly acting force upon the vehicle seat back rest, the latter cannot yield. On relaxation of the traction force upon the piston rod 3 a pressure reduction takes place in the partial chamber 10 and when there is equality of pressures between the partial chambers 10 and 11 the sealing lip 14 returns into the position as illustrated in FIG. 1. When the piston rod 3 is driven fully out the piston 4 places itself with the end face against the bush 17 acting as stop, while the outer sealing lip 15 of the U or V ring seal 13 forms the elastic stop buffer. In this case the outer sealing lip 15 is dimensioned so that the piston 4, in the stop position, can take up the oil expansion on heating of the oil filling in the partial chamber 9, even at the maximum occurring temperature variation, and travels out in the traction direction. Then the pressure in the partial chamber 9 rises only by the spring characteristic according to the spring effect of the outer sealing lip 15. The U or V ring seal 13 accordingly forms with the sealing lip 14, which co-operates with the piston rod 3, the locking device closing in the case of pressure difference, and further serves as seal in relation to the inner wall of the container 1 and as elastic stop with the outer sealing lip 15.

Figure 2:
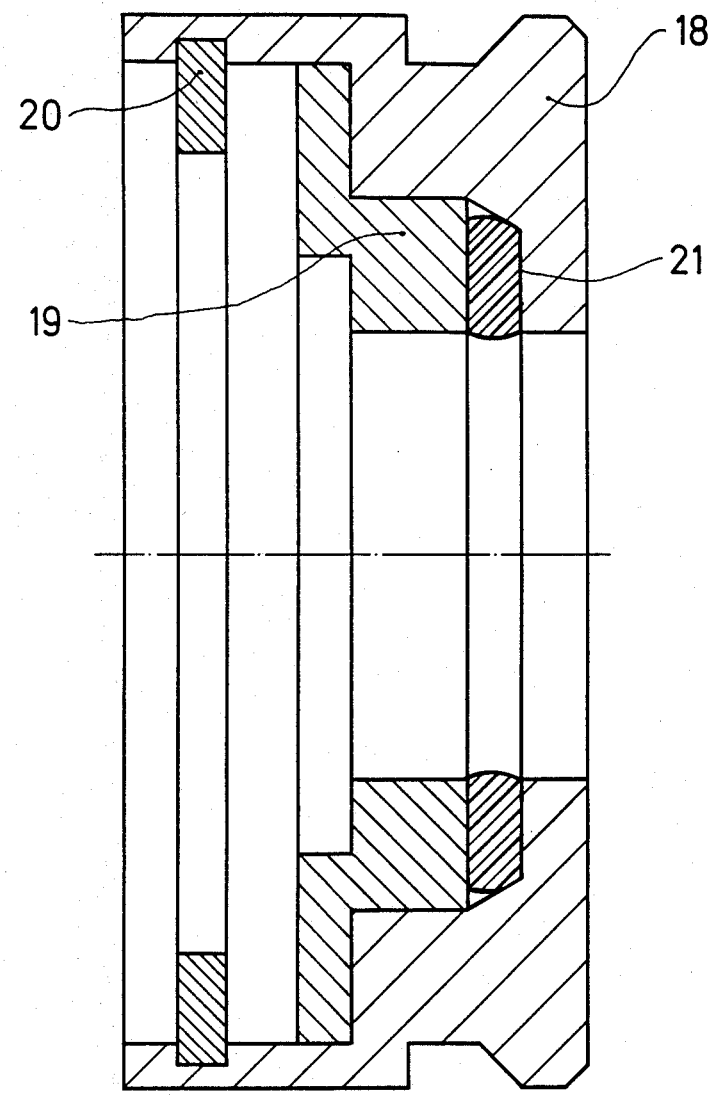
FIG. 2 shows the embodiment of a locking device connected with a partition, in enlarged representation.

The form of embodiment of a tension locking arrangement as shown in FIG. 2 consists of a partition 18 which is provided with an aperture in which an axially movable thrust washer 19 is arranged. The partition 18 is located within a cylinder as the partition 12 is located in the cylindrical container 1 of FIG. 1 with the right-hand end face of partition 18 in FIG. 2 corresponding to the upper end face of partition 12 partition 18 and an end face of the thrust washer 19 there is situated a sealing ring 21 which, in the position as shown, is so initially stressed by the thrust washer 19 that the passage cross-section between the piston rod (not shown) and the partial chambers separated by the partition 18 is thereby closed. This takes place in the present case, just as described with reference to FIG. 1, by the pressure rise in the partial chamber, which presses the pressure washer 19 against the sealing ring 21. For the limitation of the axial movement of the thrust washer 19 in the case of pressure equality in the adjoining partial chambers a stop 20 is provided in the partition 18, formed for example by a securing ring.

Figure 3:
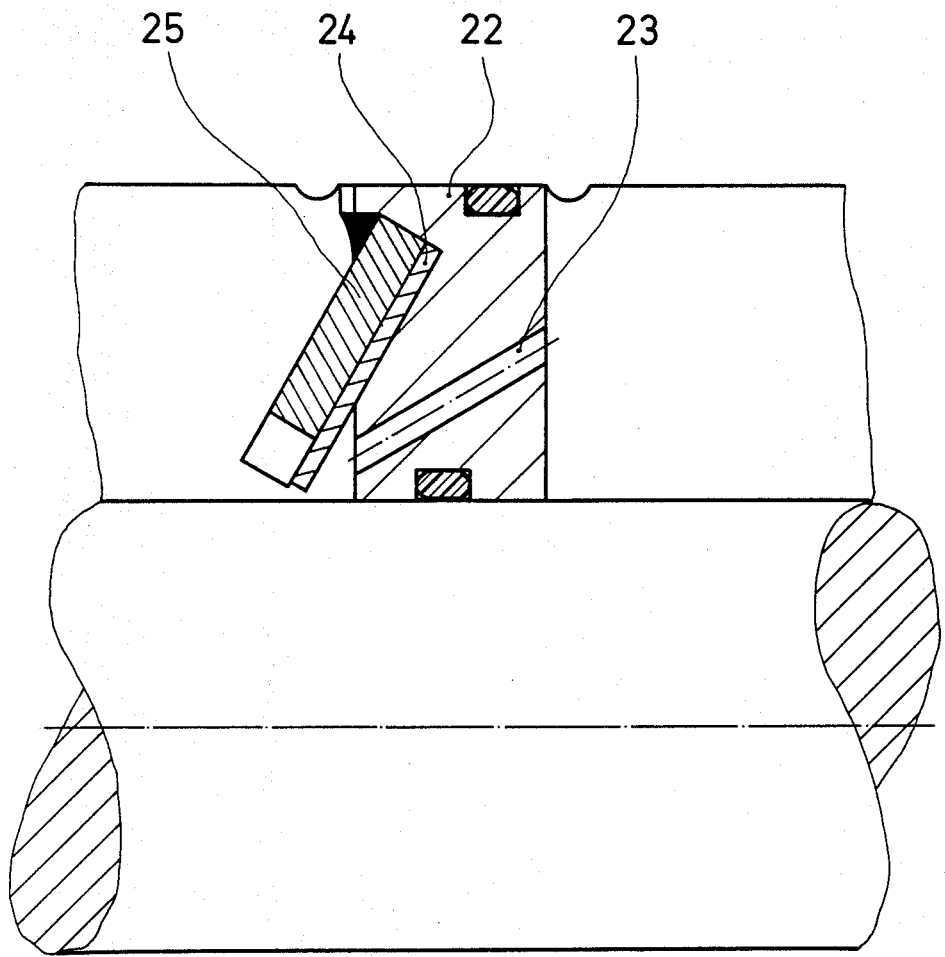
FIG. 3 shows a form of embodiment of the locking device in which the partition is provided with bores which are closed in the case of pressure difference by a valve plate.

In a further form of embodiment according to FIG. 3 the pressure-dependently acting traction locking device is formed by a partition 22 having bores 23, while a valve plate 24, formed for example by a rubber-elastic washer, is held in the opened position by a clamp washer 25 in the case of pressure equality between the adjoining working chambers. The thrust washer 25 is provided in the region of the internal diameter with piercings so that in the case of a pressure rise in the partial chamber facing the clamp washer 25 the valve plate 24 closes the bores 23 and thus effects the traction locking of the piston and piston rod.

Figure 4:
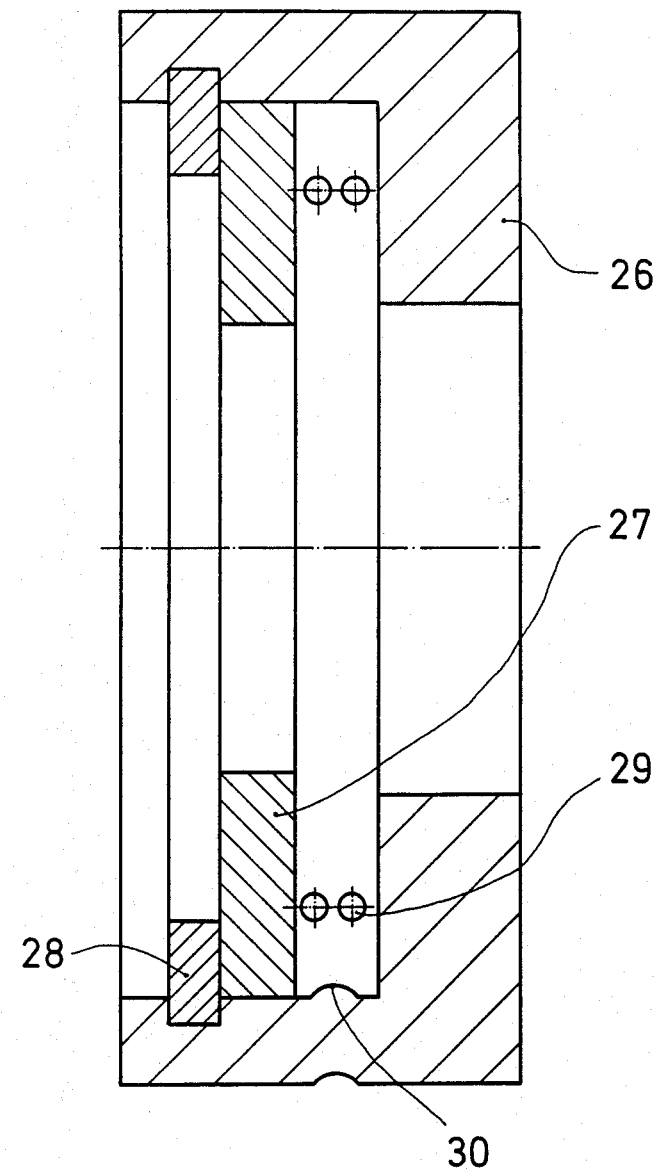
FIG. 4 shows a locking device arranged in the partition and clamping the piston rod fast in the case of a pressure difference.

FIG. 4 shows a mechanically acting traction locking arrangement. This consists of the partition 26, in the aperture of which there is provided a washer 27 acting as clamping ring, which is pressed by a spring 29 against a securing ring 28. This washer 27 is axially movable in the aperture and places itself, in the case of a pressure rise in the partial chamber on the securing ring side, on the external diameter against an abutment 30, so that in the case of sudden traction stressing the washer 27 is pressed against the spring 29 and slightly tilts, as a result of supporting on the abutment 30, and thus clamps the piston rod (not shown) fast.

Also in FIGS. 3 and 4, the right-hand end faces of the partitions 22 and 26, respectively, correspond to the upper end face of the partition 12 in FIG. 1.

The securing of the partitions 12, 18, 22 and 26, shown in the Figures, in the container is effected by appropriate corrugations in the container 1 which engage in a corresponding groove on the external circumference of the partition or hold the partition in the axial direction by means of two corrugations corresponding to the axial height. The forms of embodiment according to FIGS. 2, 3 and 4 permit a pre-fitting of the traction locking device, the corresponding partition being united into one component with the locking device and then being fitted by corrugations in the container tube.

While specific embodiments of the invention have been shown and described in detail to illustrate the application of the inventive principles, it will be understood that the invention may be embodied otherwise without departing from such principles.

It is to be noted that the reference number in the claims are only provided in view of facilitating the understanding of the claims. These reference numbers are by no means to be understood as restrictive.

What is claimed is:

1. A continuously adjustable length adjustment device wherein
  (a) a cylindrical container is provided having an axis, two end walls, namely a first and a second end wall and a cavity between said two end walls;
  (b) a piston rod axially extends inwards and outwards of said cavity through said first end wall;
  (c) a piston unit is connected with said piston rod within said cavity and divides said cavity into two subcavities, a first subcavity adjacent said first end wall and a second subcavity adjacent said second end wall;

(d) said first subcavity contains an elastically compressible compensation volume adjacent said first end wall and a hydraulic volume adjacent said piston unit;

(e) said hydraulic volume and said second subcavity are filled with a hydraulic liquid;

(f) said hydraulic volume and said second subcavity are interconnected by passage means;

(g) voluntarily operable valve means are provided for opening and closing said passage means;

(h) an annular partition unit is provided within said hydraulic volume axially intermediate said elastic compensation volume and said piston unit, said partition unit separating said hydraulic volume into a first subvolume adjacent said elastic compensation volume and a second subvolume adjacent said piston unit;

(i) throttled throughflow means interconnect said first and second subvolumes such that a pressure difference occurs between a higher pressure within said second subvolume and a lower pressure in said first subvolume in response to traction acting onto said piston rod in the sense of extraction of said piston rod from said container in the closed state of said voluntarily operable valve means; and (k) locking means are provided for preventing extraction of said piston rod, said locking means being exclusively responsive to said pressure difference so as to enter a locking condition before said piston unit mechanically engages said locking means.

2. A continuously adjustable length adjustment device as set forth in claim 1, wherein said locking means comprise pressure-responsive valve means (14) closing said throughflow means (16) in response to a predetermined amount of said pressure difference.

3. A continuously adjustable length adjustment device as set forth in claim 2, wherein said through-flow means (16) comprises an annular throughflow channel (16) defined radially between said piston rod (3) and said partition unit (12), and wherein said pressure-responsive valve means (14) comprise a ring seal member (13) supported by said annular partition unit (12) and having a sealing lip (14) sealingly engaging said piston rod (3) in response to said predetermined amount of said pressure difference.

4. A continuously adjustable length adjustment device wherein (a) a cylindrical container is provided having an axis, two end walls, namely a first and a second end wall, and a cavity between said two end walls;

(b) a piston rod axially extends inwards and outwards of said cavity through said first end wall;

(c) a piston unit is connected with said piston rod within said cavity and divides said cavity into two subcavities, a first subcavity adjacent said first end wall and a second subcavity adjacent said second end wall;

(d) said first subcavity contains an elastically compressible compensation volume adjacent said first end wall and a hydraulic volume adjacent said piston unit;

(e) said hydraulic volume and said second subcavity are filled with a hydraulic liquid;

(f) said hydraulic volume and said second subcavity are interconnected by passage means;

(g) voluntarily operable valve means are provided for opening and closing said passage means;

(h) an annular partition unit is provided within said hydraulic volume axially intermediate said elastic compensation volume and said piston unit, said partition unit separating said hydraulic volume into a first subvolume adjacent said elastic compensation volume and a second subvolume adjacent said piston unit;

(i) throttled throughflow means interconnect said first and second subvolumes such that a pressure difference occurs between a higher pressure within said second subvolume and a lower pressure in said first subvolume in response to traction acting onto said piston rod in the sense of extraction of said piston rod from said container in the closed state of said voluntarily operable valve means; and (k) locking means are provided for preventing extraction of said piston rod, said locking means including a clamping member for clamping said piston rod in response to a predetermined amount of said pressure difference, said clamping member being an annular washer axially movable in response to said pressure difference against elastic supporting means and twistable about a circumferential line around said axis exclusively as a result of said pressure difference without said piston unit acting on said annular washer, twisting of said washer effecting engagement of said washer with said piston rod.

5. A continuously adjustable length adjustment device wherein (a) a cylindrical container is provided having an axis, two end walls, namely a first and a second end wall, and a cavity between said two end walls;

(b) a piston rod axially extends inwards and outwards of said cavity through said first end wall;

(c) a piston unit is connected with said piston rod within said cavity and divides said cavity into two subcavities, a first subcavity adjacent said first end wall and a second subcavity adjacent said second end wall;

(d) said first subcavity contains an elastically compressible compensation volume adjacent said first end wall and a hydraulic volume adjacent said piston unit;

(e) said hydraulic volume and said second subcavity are filled with a hydraulic liquid;

(f) said hydraulic volume and said second subcavity are interconnected by passage means;

(g) voluntarily operable valve means are provided for opening and closing said passage means;

(h) an annular partition unit is provided within said hydraulic volume axially intermediate said elastic compensation volume and said piston unit, said partition unit separating said hydraulic volume into a first subvolume adjacent said elastic compensation volume and a second subvolume adjacent said piston unit;

(i) throttled throughflow means including an annular throughflow passage around the piston rod, interconnect said first and second subvolumes such that a pressure difference occurs between a higher pressure within said second subvolume and a lower pressure in said first subvolume in response to traction acting onto said piston rod in the sense of extraction of said piston rod from said container in the closed state of said voluntarily operable valve means; and (k) locking means are provided for preventing extraction of said piston rod, said locking means including pressure-responsive valve means for closing said throughflow means in response to a predetermined amount of said pressure difference, said pressure-responsive valve means including an elastic annular valve member having a sealing edge of a variable diameter, said sealing edge being sealingly engageable with the piston rod in response to said predetermined amount of pressure difference.

6. A continuously adjustable length adjustment device as set forth in claim 5, wherein said elastic compensation volume comprises an annular separator piston located axially between said first end wall and said partition unit and being in sealing engagement with an inner face of said container and with said piston rod, and further comprises a body of pressurized gas contained between said first end wall and said annular separator piston.

7. A continuously adjustable length adjustment device as set forth in claim 5, wherein said elastic compensation volume comprises an annular separator piston located axially between said first end wall and said partition unit and being in sealing engagement with an inner face of said container and with said piston rod, and further comprises a mechanical spring unit axially engaging both said first end wall and said annular separator piston.

8. A continuously adjustable length adjustment device as set forth in claim 5, wherein said elastic annular valve member is located adjacent said second subvolume and has a free end directed towards said piston unit.

9. A continuously adjustable length adjustment device as set forth in claim 8, wherein said free end is provided as a tubular end portion arranged so as to surround said piston rod with a radial distance therefrom, said sealing edge being located at the free end of said tubular end portion.

10. A continuously adjustable length adjustment device as set forth in claim 8, wherein said elastic annular valve member is provided with a substantially axially extending annular groove opening towards said piston unit, and said sealing edge is adjacent said annular groove on the radially inner side thereof.

11. A continuously adjustable length adjustment device as set forth in claim 5, wherein said throughflow means comprises an annular through-flow channel defined radially between said piston rod and said partition unit, and wherein said pressure-responsive valve means comprise a sealing ring member located axially between said partition unit and a pressure washer being exposed to said higher pressure within said second subvolume such as to axially compress said sealing ring member, said sealing ring member engaging said piston rod in response to axial compression thereof.

12. A continuously adjustable length adjustment device as set forth in claim 5, wherein elastic abutment means for said piston unit are located adjacent said partition unit.

13. A continuously adjustable length adjustment device as set forth in claim 12, wherein said piston unit engages said elastic abutment means through an annular bush slidably guided at the inner face of said cylindrical container.

14. A continuously adjustable length adjustment device as set forth in claim 12, wherein said elastic abutment means comprise an elastic member adjacent said partition unit.

15. A continuously adjustable length adjustment device as set forth in claim 14, wherein said elastic member is part of a sealing ring member, said sealing ring member being a component of said locking means.

16. A continuously adjustable length adjustment device wherein
(a) a cylindrical container is provided having an axis, two end walls, namely a first and a second end wall, and a cavity between said two end walls;
(b) a piston rod axially extends inwards and outwards of said cavity through said first end wall;
(c) a piston unit is connected with said piston rod within said cavity and divides said cavity into two subcavities, a first subcavity adjacent said first end wall and a second subcavity adjacent said second end wall;
(d) said first subcavity contains an elastically compressible compensation volume adjacent said first end wall and a hydraulic volume adjacent said piston unit;
(e) said hydraulic volume and said second subcavity are filled with a hydraulic liquid;
(f) said hydraulic volume and said second subcavity are interconnected by passage means;
(g) voluntarily operable valve means are provided for opening and closing said passage means;
(h) an annular partition unit is provided within said hydraulic volume axially intermediate said elastic compensation volume and said piston unit, said partition unit separating said hydraulic volume into a first subvolume adjacent said elastic compensation volume and a second subvolume adjacent said piston unit;
(i) throttled throughflow means interconnect said first and second subvolumes such that a pressure difference occurs between a higher pressure within said second subvolume and a lower pressure in said first subvolume in response to traction acting onto said piston rod in the sense of extraction of said piston rod from said container in the closed state of said voluntarily operable valve means; and
(k) locking means are provided for preventing extraction of said piston rod, said locking means being responsive to said pressure difference, said locking means including a securing ring, a clamping member, and spring means for pressing said clamping member against said securing ring in response to said pressure difference, said clamping member being axially movable so as to rest against an abutment when a pressure rise on the securing ring side occurs so that when a sudden traction stressing occurs the clamping member is pressed against the spring means so as to tilt from contact with the abutment and clamp the piston rod, the tilt of said clamping member being exclusively a result of said pressure difference and in no way resulting from contact with said piston unit.

17. A continuously adjustable length adjustment device wherein
(a) a cylindrical container is provided having an axis, two end walls, namely a first and a second end wall, and a cavity between said two end walls;
(b) a piston rod axially extends inwards and outwards of said cavity through said first end wall;
(c) a piston unit is connected with said piston rod within said cavity and divides said cavity into two subcavities, a first subcavity adjacent said first end wall and a second subcavity adjacent said second end wall;
(d) said first subcavity contains an elastically compressible compensation volume adjacent said first end wall and a hydraulic volume adjacent said piston unit;
(e) said hydraulic volume and said second subcavity are filled with a hydraulic liquid;
(f) said hydraulic volume and said second subcavity are interconnected by passage means;
(g) voluntarily operable valve means are provided for opening and closing said passage means;
(h) an annular partition unit is provided within said hydraulic volume axially intermediate said elastic compensation volume and said piston unit, said partition unit separating said hydraulic volume into a first subvolume adjacent said elastic compensation volume and a second subvolume adjacent said piston unit;
(i) throttled throughflow means including a partition unit having at least one substantially axially directed bore therethrough so as to interconnect said first and second subvolumes such that a pressure difference occurs between a higher pressure within said second subvolume and a lower pressure in said first subvolume in response to traction acting onto said piston rod in the sense of extraction of said piston rod from said container in the closed state of said voluntarily operable valve means; and
(k) locking means are provided for preventing extraction of said piston rod, said locking means including pressure-responsive value means for closing said throughflow means in response to a predetermined amount of said pressure difference, said pressure-responsive valve means including a rubber-elastic washer held in place by a clamp washer so as to be between the partition unit and the clamp washer in the region of the at least one bore so that said rubber-elastic washer is held in a position where the bore is open when pressure in the working chambers is equal, and in a position where the bore is closed when pressure rises in the chamber facing the clamp washer so as to effect locking of the piston and piston rod.

18. A continuously adjustable length adjustment device as set forth in claim 17, wherein said piston rod has an axis, said rubber-elastic washer being provided so as to be inclined with respect to a plane perpendicular to said piston rod axis in said open bore position, said rubber-elastic washer having a radial inner zone which is deflectable in said closed bore position so as to be in the plane substantially perpendicular to said piston rod axis and cover said bore, said clamp washer having at least one recess at its radially inner edge.

* * * * *